United States Patent Office 3,078,150
Patented Feb. 19, 1963

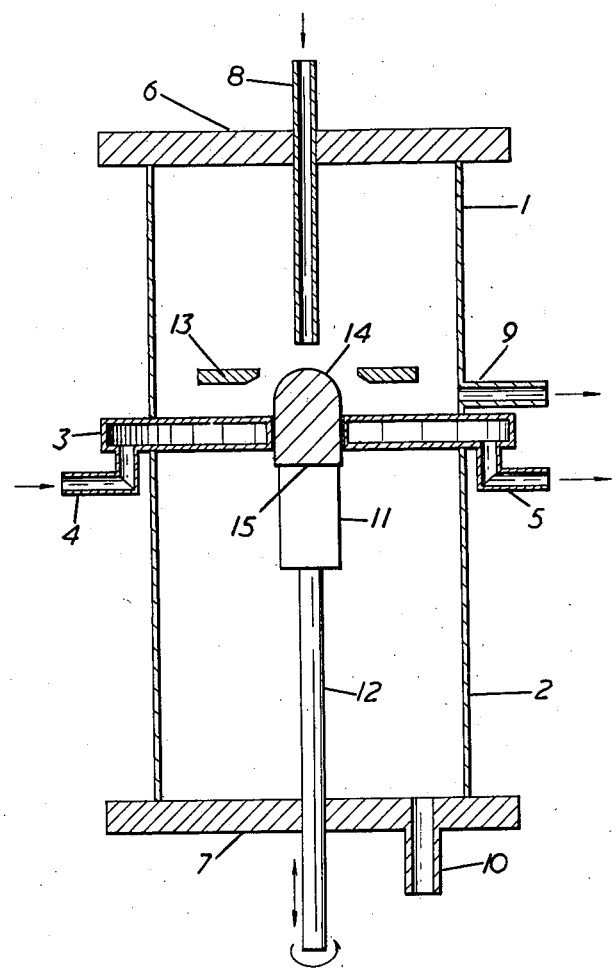

3,078,150
PRODUCTION OF SEMI-CONDUCTOR MATERIALS
Frederick John Raymond, London, England, assignor to International Standard Electric Corporation, New York, N.Y., a corporation of Delaware
Filed May 1, 1959, Ser. No. 810,406
Claims priority, application Great Britain May 14, 1958
4 Claims. (Cl. 23—223.5)

The present invention relates to a method and apparatus for producing semiconductor materials of high purity and more particularly to producing them in the form of single crystals.

Semiconductor materials which are to be used for the production of semiconductor devices such as diodes and transistors are usually required in an exceedingly pure and monocrystalline form. Great care is necessary during the production and subsequent processing of the material in order that contamination may be avoided. Particular difficulties are encountered in the case of silicon, which is more reactive than germanium, for example, and consequently more difficult to obtain in a pure form.

A method of producing such high purity silicon has been described in the specification of British Patent No. 745,698. An intermediate product is the gas silane ($SiH_4$) which can be produced by this method to the same degree of purity as that required for the final silicon. On being brought into contact with a hot surface, in this case a silicon seed crystal, the gas is decomposed into its constituents, silicon and hydrogen. By proper choice of the conditions of temperature, pressure and flow rate, and provided there are no other hot surfaces nearby, the silicon produced is deposited on to the hot seed. The hydrogen is removed as a non-reactive waste product.

As stated in the above specification the use of a single crystal of silicon as the seed ensures that part of the deposited silicon is also in the form of a single crystal. However, parts of the deposit will be polycrystalline and irregular in shape and the crystal will be unsuitable for use without further processing.

A method of converting this crystal into monocrystalline material, without the use of a crucible or container which might contaminate the silicon, is described in French patent of addition No. 72,741, granted November 30, 1959. The present invention modifies the processes described in the specification of British Patent No. 745,698 in such a way that there is no need for the additional crystal pulling described in French patent of addition No. 72,741, granted November 30, 1959. The conditions under which the silane is decomposed are such that the resulting silicon body is of monocrystalline formation. Polycrystalline growth is avoided by having a zone of the seed crystal molten and ensuring that deposition takes place on to this rather than on to the nearby hot solid region. A shield is provided to keep the silane away from the hot solid while at the same time allowing it to come into contact with the melt. Enlargement of the solid part of the seed then takes place by freezing of the liquid at the solid-liquid interface only. Provision is made for maintaining the solid-liquid interface in the same position relative to the heating arrangement while at the same time the seed crystal is progressively withdrawn.

Accordingly the present invention provides a method of producing a single crystal of a substantially pure semiconducting element by thermal decomposition of a hydride of the element, comprising bringing a substantially pure hydride of said semiconducting element in a molecular concentration substantially less than normal into contact with a molten zone at one end of a single crystal seed of said semiconducting element, the unmelted portion of said seed being shielded from said hydride.

By "molecular concentration" is meant the percentage ratio of the number of molecules actually present in one cubic centimetre of the gas to the number which would be present in one cubic centimetre of the gas at atmospheric pressure and at the decomposition temperature. The statement that the "molecular concentration is substantially less than normal" means that the above defined ratio is less than 100 percent. Such a reduced molecular concentration may be obtained by storing the gas in a container and then drawing it off under reduced pressure. Alternatively, the gas may be diluted with an inert gas such as argon.

The invention will be described with reference to the accompanying drawing which shows diagrammatically an apparatus used for the production of a single crystal of silicon according to the invention.

The apparatus comprises a cylindrical container made from glass or transparent quartz tube and closed at the ends by plates 6 and 7. It is divided into upper and lower chambers 1 and 2 by a coaxially arranged hollow annular partition 3, preferably of silver, which is kept cool by water or other suitable fluid circulated therethrough by means of pipes 4 and 5.

Silane gas prepared in pure form by a convenient method such as the reaction of lithium aluminium hydride with silicon tetrachloride is admitted to the upper chamber through an inlet pipe 8 which passes through the upper plate 6. Hydrogen, resulting from the decomposition of silane, and any undecomposed silane are removed from the upper chamber through pipe 9. Control on the pressure and composition of the gas in the lower chamber is made via pipe 10.

A single crystal seed 11 is mounted on a rod 12 which passes coaxially through the lower plate 7 and can be rotated and lowered by conventional mechanisms (not shown). The upper end of the seed (shaded area 14) is melted by direct coupling to an annular coil 13 which is supplied with high frequency alternating current by conventional means (not shown). Coil 13 is made of the same shape as that described in French patent of addition No. 72,741, granted November 30, 1959, in order that the electromagnetic field acting on the molten silicon should assist the surface tension forces in holding this molten portion in position. The partition 3 modifies the electromagnetic field in such a manner that it also assists in maintaining the molten silicon in position. Throughout the crystal growing operation the solid-liquid interface 15 is maintained in the lower chamber 2. The central hole in the partition 3 is of substantially the same diameter as the crystal to be grown and though in contact with the molten silicon is not wetted by it. The area of contact between the molten silicon and the partition acts as a seal which keeps the upper and lower chambers substantially isolated from one another with respect to silane.

Vacuum equipment connected to tube 9 draws silane gas at reduced pressure through the tube 8 and into the hot decomposition region near to the molten silicon surface. Decomposition into silicon and hydrogen may take place at the molten surface or by a gas phase reaction. Consequently values of the interdependent factors such as the streaming velocity of the gas at the molten surface and the pressure and temperature of the gas must be chosen so that only the surface reaction takes place. Gas phase decomposition is undesirable since most of the silicon so produced will be deposited on to other parts of the apparatus rather than in the molten zone. Alternatively, the silane may be swept into the chamber by argon or another chemically inert gas. Similar considerations to those given above apply with regard to ensuring a surface reaction. According to one example of the process, using reduced pressure to draw the silane into the decomposition region, the temperature of the molten silicon surface is maintained at a temperature a few degrees above the melting point and the pressure and flow rate of the silane kept at 10 mms. Hg and 10 litres per hour at S.T.P., respectively. The pressure in the lower chamber is adjusted to maintain the seal that is provided by the partition and the molten silicon, an inert gas being fed in at 10.

The seed 11 is moved downwards, away from the hot region, at a rate corresponding to the rate of deposition of silicon on to the molten surface. In this manner the volume of the molten portion and its position relative to the partition 3 and coil 13 remain substantially constant. Solidification at the solid-liquid interface continues in the monocrystalline form of the seed crystal.

Any silane which is not decomposed at the molten surface of the silicon in the upper chamber is withdrawn through the tube 9 rather than through the region between the molten silicon and the partition and into the lower chamber. Isolation of the silane from the solid-liquid interface in this manner prevents decomposition and polycrystalline growth on the hot solid silicon surface nearby. The water cooled partition must be thick enough to provide an appreciable area adjacent to the molten silicon, to form an efficient gas seal of this type. On the other hand it must not be so thick, and the adjacent area so large, as to cause substantial chilling of the molten silicon, or solidification and polycrystalline growth will occur.

Owing to the high resistivity of pure silicon it may be necessary to preheat it to a temperature at which its resistance is low enough to permit heating by direct coupling to coil 13. This may be achieved by means of intermediate metal rings (not shown) placed in a position near to the coil and themselves heated by direct coupling, the initial heating of the silicon being by radiation from the hot rings. Another method is to raise the top of rod 12 into the plane of coil 13 and to heat this by direct coupling, relying on conduction to preheat the silicon.

In the embodiment described the solid-liquid interface was considered to be substantially planar and entirely below the partition 3. The contour of the liquid-solid interface is greatly influenced by the coil design and RF conditions. Boundaries which are not planar can be accommodated however, so long as the line of intersection between the solid-liquid interface and the surface of the seed crystal is below the partition.

According to the preferred process the silane is drawn into the decomposition zone under reduced pressure without the use of an inert gas. In this case values of the pressure of the silane used have been in the range 5–12 mms. Hg and values of the flow rate have been in the range 10–15 litres per hour at S.T.P. It should be understood, however, that the ranges given above do not represent the extreme limits of possible values which could be used. A wider range of pressure is certainly possible.

In one example when argon was used to sweep the silane into the decomposition zone the pressure in the upper chambers was 760 mms. Hg, the flow rate of silane .5 litre per hour at S.T.P. and the flow rate of argon 200 litres per hour at S.T.P.

While the arrangements described are adapted to the decomposition of silane they can also be used, for example, for decomposing germane to produce a monocrystalline ingot of germanium. Also certain metals other than silver can be used for the partition 3, but such metals should have a high thermal and electrical conductivity. For example, copper or gold may in certain circumstances be used instead of silver.

While the principles of the invention have been described above in connection with specific embodiments, and particular modifications thereof, it is to be clearly understood that this description is made only by way of example and not as a limitation on the scope of the invention.

What I claim is:

1. A method of producing a single crystal of substantially pure silicon by thermal decomposition of silane comprising melting a zone of a single crystal seed of silicon, continuously directing silane gas under a partial pressure substantially less than one atmosphere into contact with the molten zone and preventing said silane gas from coming into contact with any solid portion of said seed.

2. A method of producing a single crystal of substantially pure silicon which comprises applying heating means to establish a molten zone at one end of a single crystal seed of silicon, flowing substantially pure silane under a partial pressure substantially less than one atmosphere into contact with said molten zone, thereby decomposing said silane and depositing silicon on to the surface of said molten zone, shielding the unmelted portion of said seed from said silane, and withdrawing said seed from said heating means at a rate substantially equal to the rate of deposition of silicon from said silane simultaneously maintaining a chemically inert gas atmosphere around the solid-liquid interface of said seed to prevent said silane from contacting the solid portion of said seed.

3. A method according to claim 2 wherein said silane is swept into contact with said molten zone by means of a chemically inert gas.

4. A method of producing a single crystal of substantially pure silicon which comprises applying heating means to establish a molten region at one end of a single crystal seed of silicon, flowing substantially pure silane under a partial pressure substantially less than one atmosphere into contact with said molten region, thereby decomposing said silane and depositing silicon onto the surface of said molten region, mechanically dividing the area around said seed crystal into two zones with a first exclusive zone around only the molten region of said seed crystal, and a second exclusive zone around only the solid portion of said seed crystal, so as to impede the entry of said silane gas into said second exclusive zone, and further withdrawing said seed from said heating means at a rate substantially equal to the rate of deposition of silicon from said silane, and simultaneously maintaining an inert gas atmosphere in said second exclusive zone around the solid portion of said seed thereby preventing the entry of silane gas into said second zone.

References Cited in the file of this patent

UNITED STATES PATENTS

| 2,768,074 | Stauffer | Oct. 23, 1956 |
| 2,773,750 | Conant | Dec. 11, 1956 |
| 2,904,404 | Ellis | Sept. 15, 1959 |
| 2,909,411 | Krchma | Oct. 20, 1959 |
| 2,912,311 | Mason et al. | Nov. 10, 1959 |

FOREIGN PATENTS

| 745,698 | Great Britain | Feb. 29, 1956 |

OTHER REFERENCES

Hogness et al: "American Chemical Society Journal," 1936, vol. 58, pages 108–112.